United States Patent
Danneels et al.

(10) Patent No.: US 6,272,472 B1
(45) Date of Patent: Aug. 7, 2001

(54) DYNAMIC LINKING OF SUPPLIER WEB SITES TO RESELLER WEB SITES

(75) Inventors: Gunner D. Danneels; Peter A. Nee; James Tsai, all of Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/222,522

(22) Filed: Dec. 29, 1998

(51) Int. Cl.[7] .................................................. G06F 17/60
(52) U.S. Cl. .................................. 705/27; 705/26; 705/14
(58) Field of Search .................................. 705/27, 26, 14

(56) References Cited

U.S. PATENT DOCUMENTS

| | | | | |
|---|---|---|---|---|
| 5,710,887 | * | 1/1998 | Chelliah et al. ...................... | 395/226 |
| 5,913,210 | * | 6/1999 | Call ......................................... | 707/4 |
| 6,016,504 | * | 1/2000 | Arnold et al. ........................ | 709/200 |
| 6,021,426 | * | 2/2000 | Douglis et al. ...................... | 709/200 |

OTHER PUBLICATIONS

John Evan Frook, Serving Up E–Commerce–Ingram seizes leadership role via hosting strategy, Internet week, No. 723, p. 1, Jul. 13, 1998.*

David Clark, Cisco Connectet Online: It's Good for Business, http://computer.org/internet/, Nov.–Dec. 1997.*

* cited by examiner

Primary Examiner—Vincent Millin
Assistant Examiner—Pedro Kanof
(74) Attorney, Agent, or Firm—Schwegman, Lundberg, Woessner & Kluth, P.A.

(57) ABSTRACT

The dynamic linking of supplier web sites to reseller web sites in the context of electronic commerce, for example, over the Internet. In one embodiment, a computer-implemented method. A plurality of items to be purchased is selected on a supplier's web site. A list of reseller's web sites is dynamically generated from a database and displayed. One of the reseller's web sites is linked to, such that information is transmitted to this reseller's web site regarding the plurality of items to be purchase.

18 Claims, 3 Drawing Sheets

DYNAMIC LINKING OF SUPPLIER WEB SITES TO RESELLER WEB SITES

FIELD OF THE INVENTION

This invention relates generally to electronic commerce over the Internet, and more particularly to the interrelationship of supplier web sites to web sites of their resellers.

BACKGROUND OF THE INVENTION

Electronic commerce over the Internet has become increasingly popular. In one type of electronic commerce, a purchaser accesses a web site of a supplier, from which the purchaser cannot directly purchase items for sale, but can browse items that can be purchased by the supplier's resellers. Frequently, the supplier's web site has links to web sites of the resellers, so that once the purchaser has obtained information about the items he or she wishes to purchase, the purchaser can link to a reseller's web site to purchase the items.

However, as provided by the prior art, this process can be cumbersome for the purchaser, as well as the supplier. Usually, there is no information exchange between the supplier's web site and the resellers' web sites. This means that the purchaser, after browsing the supplier's web site to determine which items to purchase, must manually reselect the items to purchase when he or she links to a desired reseller's web site. For example, even if the supplier's web site provides a shopping cart feature that allows the purchaser to collect a list of items that are desired to be purchased, the purchaser usually has to recollect the list of items to be purchased when he or she links to the desired reseller's web site. In addition, not all resellers may carry all of the supplier's products. This provides for a less than convenient electronic commerce experience for the purchaser. In addition, for the supplier, the supplier must maintain several different systems for different resellers.

For these and other reasons, there is a need for the present invention.

SUMMARY OF THE INVENTION

In one embodiment, a computer-implemented method first includes selecting a plurality of items on a supplier's web site to be purchase. A list of reseller's web sites is then generated dynamically from a database and displayed. Finally, one of the reseller's web sites is linked to, such that information is transmitted to the one of the reseller's web sites regarding the plurality of items to be purchased.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
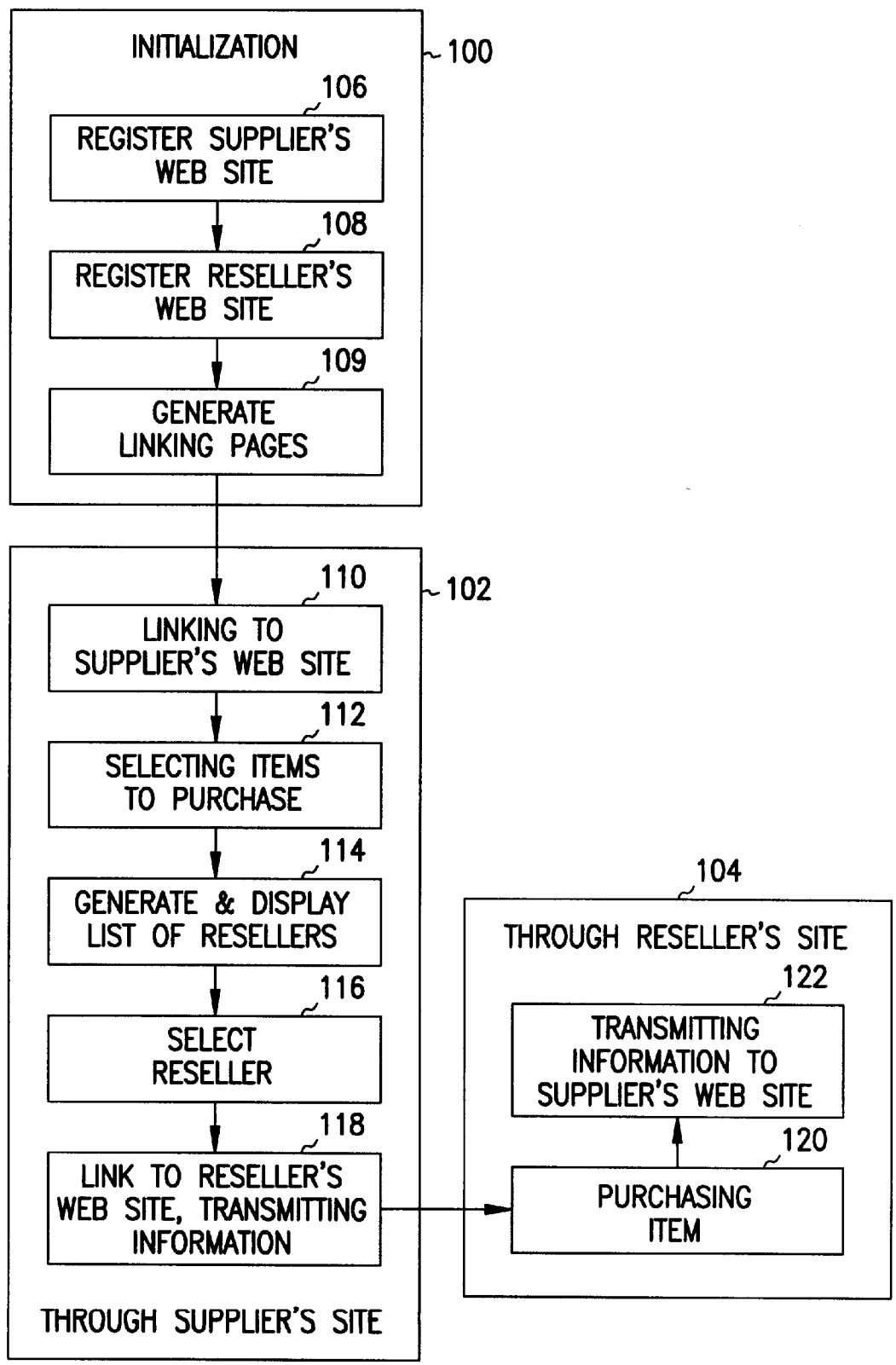
FIG. 1 shows a computer-implemented method according to an embodiment of the invention.

Referring first to FIG. 1, a computer-implemented method according to an embodiment of the invention is shown. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer. The method includes three sections: a first, initialization section 100, a second section 102 performed in conjunction with a supplier's web site, and a third section 104 performed in conjunction with a reseller's web site. Each of the second section 102 and the third section 104 may be performed also in conjunction with a purchaser's web browser, such that, for example, the supplier's and the reseller's web sites are accessed by the browser over the Internet, as known in the art.

The method of FIG. 1 shows how the invention in one embodiment provides for dynamic linking of a supplier's web site with a reseller's web site, to provide for more convenient electronic commerce by a purchaser having a web browser. Section 100 includes blocks 106, 108 and 109. In block 106, the supplier's web site is registered. In one embodiment, this entails the entering of information regarding the supplier's web site into a database. For example, information regarding a plurality of items that may be selected for purchase on the supplier's web site is entered into a database.

In block 108, each of the resellers' web sites is registered with the supplier's web site. In one embodiment, this entails the entering of information regarding the reseller's web site into the database. This may include specific page links into the reseller's web site, by Universal Resource Locator (URL) addresses as known in the art, contact information of the reseller (name, address, phone number, etc.), and also information regarding the items of the supplier that are available from the reseller for purchase. The database of the information entered in blocks 106 and 108 is maintained by the supplier's web site. Finally, in block 109, a linking page for each of the reseller's web sites is generated. In one embodiment, the linking page is a page at the reseller's web site generated by the supplier's web site, and to which the supplier will link a purchaser when the purchaser wishes to purchase items of the supplier for sale by the reseller.

Once the initialization section 100 has been performed, the supplier's web site and the resellers' web sites are ready to be accessed by the purchaser's web browser. This is first accomplished by the section 102 of the method of FIG. 1. In block 110, the purchaser links to the supplier's web site through his or her web browser. In one embodiment, this entails entering in the supplier's web site, as specified by a URL address, in the purchaser's web browser. In block 112, the purchaser selects a plurality of items he or she wishes to purchase, on the supplier's web site. In one embodiment, this can entail the browsing of an on-line catalog, such that the purchaser adds desired items to an on-line shopping cart, as known in the art. The supplier's web site ultimately receives a request to select the items to be purchased.

Once the purchaser has finished selecting the items to be purchased, then in block 114, the supplier's web site generates dynamically and displays a list of resellers from which the purchaser can directly purchase the desired plurality of items. In one embodiment, this entails querying the database that has stored therein information regarding all resellers, to retrieve a list of resellers from which the purchaser can purchase the items. This list can in one embodiment also be narrowed in various ways: for example, those resellers in the purchaser's proximate geographic area, those resellers that sell to government institutions, etc.; the invention is not necessarily so limited.

In block 116, the purchaser selects a desired reseller from which he or she wishes to purchase the items selected on the supplier's web site. In block 118, the supplier's web site then links the purchaser's web browser to the desired reseller's web site. This includes transmitting information to the reseller's web site regarding the plurality of items to purchase, and can also include linking the purchaser's web browser to the linking page of the desired reseller previously generated in block 109. The information transmitted to the reseller's web site provides at least some embodiments of the invention an advantage over the prior art: the user does not have to reselect the list of items to be purchased once he or she is linked to the reseller's web site. Rather, information regarding the list of items already selected at the supplier's web site is conveyed to the reseller's web site. This makes the electronic commerce experience more convenient for the purchaser.

Once the purchaser's web browser has been linked to the desired reseller's web site in block 118, which can involve jumping to a reseller's linking page as specified by a URL address, then this reseller's web site is accessed. This is accomplished by section 104 of the method of FIG. 1. In block 120, the purchaser actually purchases the items that were previously selected at the supplier's web site. In one embodiment, this can entail the purchaser being shown a list of the items that were previously selected, along with prices therefor, such that the purchaser has the opportunity to change quantities of the items to be purchased.

Finally, in block 122, the reseller's web site sends feedback regarding the purchase back to the supplier's web site. This provides at least some embodiments of the invention with advantages over the prior art. For example, the supplier is able to track what items were actually purchased at the resellers to which it linked purchasers. Thus, a "success rate" of how many would-be purchasers actually purchased items can be calculated. In the prior art, by comparison, such information is not generated nor automatically sent back to the supplier.

Figure 2:
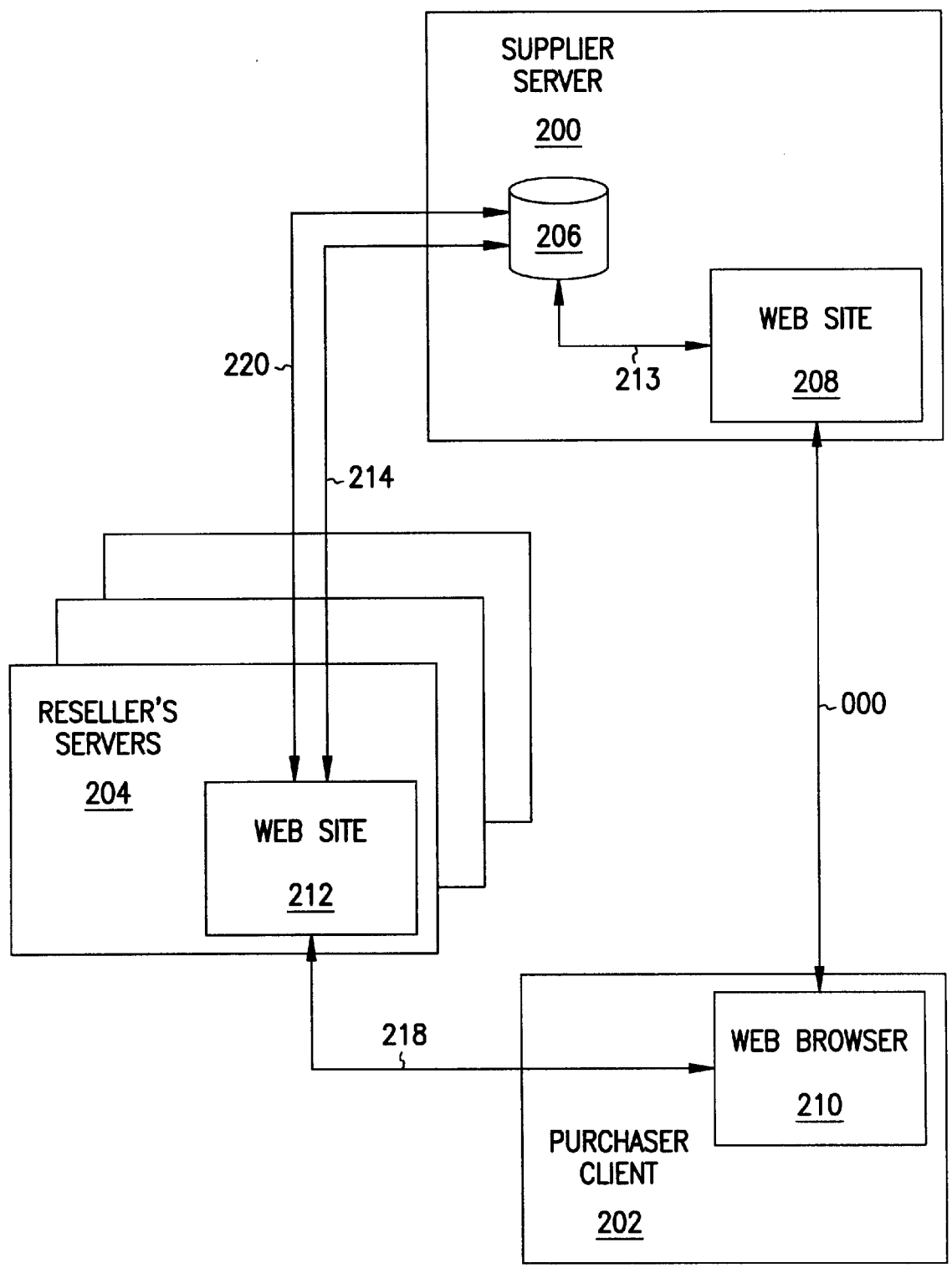
FIG. 2 shows a diagram of a computerized system in accordance with an embodiment of the invention.

Referring next to FIG. 2, a diagram of a system in accordance with an embodiment of the invention is shown. The system of FIG. 2 can, for example, provide the manner by which the method of FIG. 1 is implemented. However, the invention is not so limited. The system of FIG. 2 includes three components: a supplier server 200, a purchaser client 202, and one or more reseller servers 204. Both the supplier server 200 and the reseller servers 204 provide respective web sites: the supplier server 200 provides for a supplier web site 208, and each reseller server 204 provides for a reseller web site 212. The supplier server 200 also maintains a database 206. In addition, the purchaser client 202 provides a web browser 210, such as Microsoft Internet Explorer, or Netscape Navigator, as known in the art. Supplier server 200, purchaser client 202, and reseller servers 204 communicate with one another in one embodiment desirably over the Internet, as also known in the art.

The system of FIG. 2 is now described by showing how the system can operate in accordance with an embodiment of the invention. As represented by arrow 213, the supplier's web site 208 is first registered with the database 206. The database 206 specifically stores four tables: a t_supplier_app table storing information regarding the supplier applications; a t_supplier_para table storing parameters regarding these applications; a t_reseller_app table storing information regarding the resellers' application; and, a t_reseller_para table storing parameters regarding these applications. The term applications as used herein refers to web pages that are served by a server in the context of a web site, providing for a specific functionality or having a given purpose, such as relating to a specific section of an on-line catalog, etc. The web pages can include programs executable therein, such as JavaScript or CGI programs as known in the art.

The registration of the web site 208 with the database 206 can in one embodiment include providing an interface to register information such as the applications, parameters, logos, and actions regarding the web site 208. This may be accomplished in one embodiment by a computer program of the supplier server 200 (not shown in FIG. 2). Furthermore, this may be accomplished in one embodiment via the following pseudo-code:

```
open database;
enter application name;
select app_id, app_nm from t_supplier_app;
if the application exists for the given application name
    generate updating registration page
    update t_supplier_app;
    update t_supplier_para;
else
``` generating inserting registration page
    insert record to t_supplier_app;
    insert record to t_supplier_para;
end if
close database;

Next, as represented by arrow 214, each of the reseller web sites 214 is registered with the database 206. This may be accomplished by a computer program of the supplier server 200 receiving information to be registered with the database 206 (the program not shown in FIG. 2). In one embodiment, this can entail providing an interface by the supplier server 200 for the reseller servers 204 to register information such as their applications, parameters, logos, and actions regarding the web sites 212. The reseller can choose an application for which it wants to generate information from a list of applications available (e.g., the reseller may only sell a portion of items available in the supplier's complete on-line catalog). Based on the reseller's selection, the reseller is given a set of parameters specific to the application. This may be accomplished in one embodiment via the following pseudo-code:

open database;
select app_id, app_nm from t_reseller_app;
create a list box menu;
get input from a reseller;
    select app_id, app_para, para_title, para_id from
        t_reseller_para where app_id is
    the application choice;
    create a registration form;
    get reseller registration date;
    if the reseller exists for the given application choice
        update t_reseller_app;
        update t_reseller_para;
    else
        insert record to t_reseller_app;
        insert record to t_reseller_para;
    end if
close database;

As also represented by the arrow 214, a linking page linking the supplier web site 208 to the reseller web site 212 is also generated. The generation may be accomplished by a computer program executed by the supplier server, not shown in FIG. 2. In one embodiment, there are actually two pages generated: a first page that links the site 208 to the site 212, and another page that includes a program to send feedback from the server 204 to the database 206 upon the completion of a purchase. The generation of these pages in one embodiment is accomplished by pseudo-code comparable to the pseudo-code listed in the previous paragraph.

Once the initial registration of the web sites 208 and 212 have been completed, as represented by arrows 213 and 214, then the system is set-up such that the purchaser client is able to navigate the web site 208, such that the web site 208 provides dynamic linking to the web sites 212. Thus, as represented by arrow 216, the client 202, via the web browser 210, accesses the web site 208. This access is made so that the purchaser is able to select a list of items of the supplier that can be purchased. Once the list of items has been selected, the web site 208 generates dynamically a list of resellers from which the items can be purchased.

This list is generated by the web site 208 accessing the database 206, since the database 206 stores information regarding the resellers maintaining servers 204 as well as information regarding the supplier maintaining the supplier server 200 itself. When the purchaser requests a reseller list, information previously provided and stored in the database 206 is used. The list of resellers is generated such that information is encoded therein, such that linking to a reseller's web site 212 by the purchaser's web browser 210 causes this information to be transmitted thereto. In one embodiment, the reseller list may be generated by the following pseudo-code:

open database;
for the given application (app_id);
reseller_list=
    select comp_nm, comp_id, app_id, app_url, http_
        method, logo_url,
    supplier_rating from t_reseller_app where app_id=
        the application where the
    customer comes from;
while reseller_list not empty
    create link for the reseller dynamically
    left join t_supplier_para and t_reseller_para
    while
        mapping (translating) parameters for each
            reseller in the list
        next record
        Remove reseller from list
    end loop
close database;

Furthermore, in one embodiment of the invention, an example of parameter mapping between an application of the supplier and an application of a reseller (that is, information transmittal from the supplier to the reseller) is represented by the following pseudo-code:

<form action="http://turtlejf.company.com/apps/ps/
    turtlePS.asp" method="POST">
<INPUT TYPE=Hidden NAME="processor" value=
    "Company Processor Technology, 450 MHZ">
<INPUT TYPE=Hidden NAME="qty" value="10">
<INPUT TYPE=Hidden NAME="tid" value="20-10-6/
    10/98 2:25:57 PM">
<td><input type="image" name="Submit""value="Turtle
    Inc." IMG SRC="http://turtle.jf.company.com/apps/ps/
    images/logo.gif BORDER=0 ALT=Turtle Inc.">
</td>
<td><b>Turtle Inc.</b>
</td>
</form>

Thus, this parameter mapping is the manner by which information regarding the selected items is transmitted from the web site 208 to the web site 212.

After the purchaser has selected a desired reseller from the reseller list generated, the supplier web site 208 links the purchaser's web browser 210 to the reseller's web site 212, in one embodiment via the linking page that has been already generated (as has been already described), such that the information regarding the items to be purchased is transmitted therewith (such as can be accomplished by the pseudo-code listed in the previous paragraph). The purchaser is then able to interact with the reseller's web site 212, as represented by arrow 218, for example, to modify or change quantities of the list of items to be purchased. Once the purchaser submits a purchase of these items, the web site 212 of the reseller server 204 conveys feedback information to the database 206 of the supplier server 200. This can be accomplished by execution of the program contained within the page generated in conjunction with the generation of the page linking the web sites 208 and 212, as has been already described.

Thus, the system of FIG. 2 provides for advantages not found in the prior art. As represented by arrow 216, the supplier's web site includes a dynamically generated list of resellers from which the purchaser is able to select a reseller from whom the purchaser can purchase the items selected on the supplier's web site. In addition, as represented by arrow 220, the supplier maintains information regarding the purchases made by purchasers, since the reseller web sites provide feedback back to the supplier of such purchases. Both of these advantages make for more convenient and improved electronic commerce over the Internet as compared to what is provided in the prior art.

Figure 3:
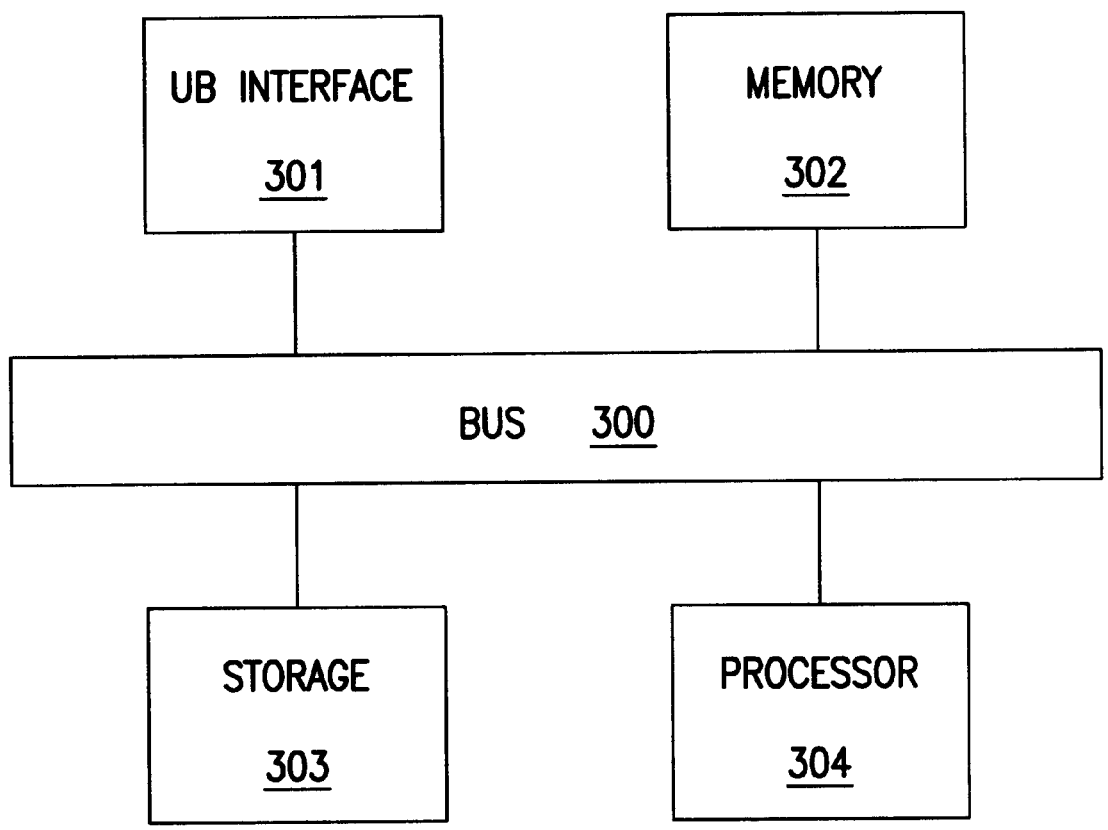
FIG. 3 shows a diagram of a computer in conjunction with which embodiments of the invention may be practiced.

Referring finally to FIG. 3, a diagram of a computer in conjunction with which embodiments of the invention may be practiced is shown. For example, the computer of FIG. 3 can act as the client, the supplier server, or the reseller server, as has been described in conjunction with FIG. 2. The computer comprises bus 300, keyboard interface 301, external memory 302, mass storage device 303 and processor 304. Bus 300 can be a single bus or a combination of multiple buses, and chipsets, other circuits, etc. Bus 300 can also comprise combinations of any buses. Bus 300 provides communication links between components in the computer. Keyboard controller 301 can be a dedicated device or can reside in another device such as a bus controller or other controller. Keyboard controller 301 allows coupling of a keyboard to the computer system and transmits signals from a keyboard to the computer system. External memory 302 can comprise a dynamic random access memory (DRAM) device, a static random access memory (SRAM) device, or other memory devices. External memory 302 stores information from mass storage device 303 and processor 304 for use by processor 304. Mass storage device 303 can be a hard disk drive, a floppy disk drive, a CD-ROM device, or a flash memory device. Mass storage device 304 provides information to external memory 302. Processor 304 can be a microprocessor and is capable of decoding and executing a computer program such as an application program or operating system with instructions from multiple instruction sets.

Dynamic linking of supplier web sites to reseller web sites has been described. Although specific embodiments have been illustrated and described her (in, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   selecting at least one purchasable item on a supplier's web site;
   generating dynamically and displaying a list of reseller's web sites from a database; and
   linking to one of the reseller's web sites, including transmitting information to the one of the reseller's web sites regarding at least one purchasable item.

2. The computer-implemented method of claim 1, further comprising transmitting information from the one of the reseller's to the supplier's web site regarding a purchase of the items, upon the purchase of the items.

3. The computer-implemented method of claim 1, wherein selecting at least one item to purchase on a supplier's web site comprises linking to the supplier's web site.

4. The computer-implemented method of claim 1, wherein linking to one of the reseller's web sites comprises initially selecting the one of the reseller's web sites.

5. The computer-implemented method of claim 1, wherein generating dynamically and displaying a list of reseller's web sites comprises retrieving the list of reseller's web sites from the database including information regarding reseller's web sites previously registered with the supplier's web site.

6. The computer-implemented method of claim 1, further comprising:
   registering the supplier's web site;
   registering the resellers's web sites with the supplier's web site; and
   generating a linking page for each of the reseller's web sites, linking the supplier's web site to the reseller's web site.

7. The computer-implemented method of claim 6, wherein registering the supplier's web site includes entering information regarding the supplier's web site into the database.

8. The computer-implemented method of claim 6, wherein registering the resellers's web sites with the supplier's web site includes entering information regarding the resellers's web site into the database.

9. A computerized system comprising:
   a client providing a web browser for a purchaser;
   a first server providing a web site of a supplier accessible by the purchaser's web browser and including a dynamically generated list of resellers from which at least one item selected by the purchaser can be purchased; and
   a second server providing a web site of a reseller of the dynamically generated list of resellers accessible by the purchaser's web browser and linked to by the supplier's web site, such that information regarding the items is transmitted from the supplier's web site to the reseller's web site during linking.

10. The computerized system of claim 9, wherein the first server comprises a database of information regarding a plurality of resellers including the list of resellers and information regarding the supplier.

11. The computerized system of claim 10, wherein the first server further comprises:
   a first program to generate a linking page for a web site of each reseller linking the supplier's web site to the reseller's web site;
   a second program to receive information regarding a reseller and enter the information in the database; and
   a third program to receive information regarding the supplier and enter the information in the database.

12. The computerized system of claim 9, wherein the web site of the reseller is to send feedback regarding a purchase of the items by the purchaser from the reseller to the web site of the supplier.

13. A machine-readable medium containing processor-executable instructions for execution by a processor to cause performance of a method comprising:
   receiving a request to select at least one purchasable item;
   generating dynamically a list of reseller's web sites from which the at least one purchase item can be purchased; and
   displaying the list of reseller's web sites.

14. The machine-readable medium of claim 13, wherein the method further comprises transmitting information regarding the items to be purchased to a selected reseller's web site of the list of reseller's web sites.

15. The machine-readable medium of claim 14, wherein the method further comprises receiving feedback regarding a purchase of the items to be purchased from the selected reseller's web site of the list of reseller's web sites.

16. The machine-readable medium of claim 13, wherein the method further comprises maintaining a database of information regarding a plurality of reseller's web sites including the list of reseller's web sites and information regarding a supplier's web site.

17. The machine-readable medium of claim 16, wherein the method further comprises:

registering the supplier's web site with the database; and registering the plurality of reseller's web sites with the database.

18. The machine-readable medium of claim 13, wherein the method further comprises generating a linking page for each of the reseller's web sites, linking the supplier's web site to the reseller's web site.

* * * * *

UNITED STATES PATENT AND TRADEMARK OFFICE
CERTIFICATE OF CORRECTION

PATENT NO. : 6,272,472 B1
DATED : August 7, 2001
INVENTOR(S) : Gunner D. Danneels, Peter A. Nee and James Tsai Page 1 of 1

It is certified that error appears in the above-identified patent and that said Letters Patent is hereby corrected as shown below:

Title page,
Item [57], ABSTRACT, delete "purchase" and insert -- purchased -- after "to be".

Column 1,
Line 46, delete "purchase" and insert -- purchased --, therefor.

Column 3,
Line 41, insert -- , -- after "can".
Line 42, insert -- , -- after "embodiment".
Line 55, insert -- , -- after "provides".
Line 55, insert -- in -- between "least" and some".
Line 56, insert -- , -- after "invention".

Column 7,
Line 39, delete "her(in," and insert -- herein --, therefor.

Column 8,
Line 57, delete "purchase" and insert -- purchasable --, therefor.

Signed and Sealed this

Thirtieth Day of April, 2002

Attest:

JAMES E. ROGAN
*Attesting Officer*  *Director of the United States Patent and Trademark Office*